July 3, 1962   R. CARMICHAEL ET AL   3,042,734
ALKALINE CELL CLOSURE
Filed Feb. 25, 1960
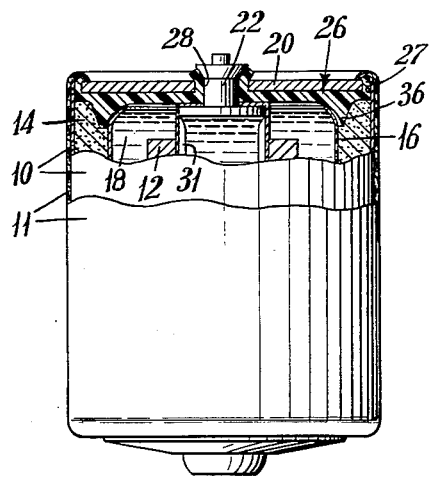
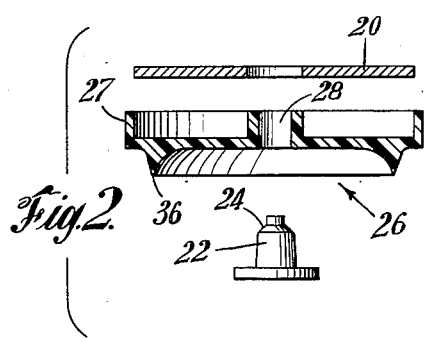
Fig. 1.
Fig. 2.
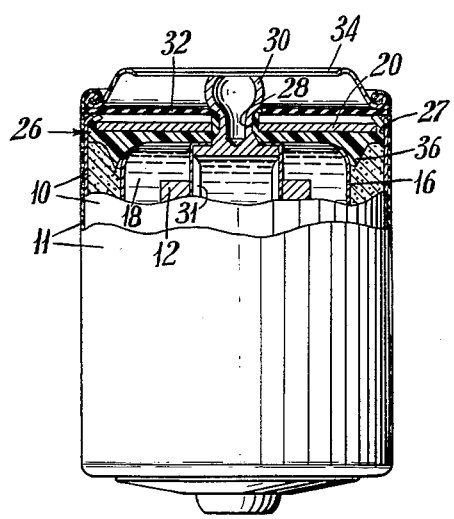
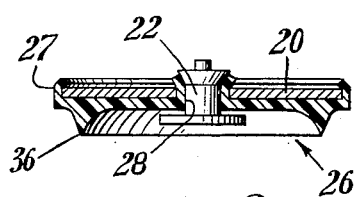
Fig. 4.
Fig. 3.
INVENTORS
ROBERT CARMICHAEL
JOHN L. S. DALEY
BY Robert C. Cummings
ATTORNEY – # United States Patent Office 3,042,734
Patented July 3, 1962

3,042,734
ALKALINE CELL CLOSURE
Robert Carmichael, Lakewood, and John L. S. Daley, Bay Village, Ohio, assignors to Union Carbide Corporation, a corporation of New York
Filed Feb. 25, 1960, Ser. No. 11,100
11 Claims. (Cl. 136—133)

This invention relates to a cell closure for an alkaline galvanic cell, such as alkaline manganese dioxide-zinc primary or secondary cell.

For many years there have been so-called "leak-proof" type cells available, but none of these cells have actually retained liquid electrolyte successfully for long periods of time. Escape of electrolyte to the outside of a cell container is particularly a problem in the case of a cell containing a caustic electrolyte, which is about the most difficult to seal, for not only is the supply of electrolyte diminished, but a hazard is created if the cell is to be handled.

Past attempts to provide leak-proof alkaline cells have shown that one of the major difficulties that must be overcome is what is termed "negative leakage," that is, creepage of the electrolyte through the seal assembly of the cell at its negative terminal side.

The problem of negative leakage is not wholly a mechanical one, but one which also involves an electrocapillary action that occurs with alkaline cells. Electrocapillary action is the result of a conductive path forming between the oppositely charged parts of a cell container, i.e., the negative container cover and the positive container, or vice-versa. This conductive path, across which an electric current will flow, may be set up inside the cell container as the result of electrolyte wetting the inside of the seal gasket used to separate the oppositely charged parts of the cell, or on the outside of the cell due to wetting of the outside of the seal gasket with moisture, such as might occur as a result of high relative humidity.

The current which flows across either conductive path is termed "electrocapillary drive." It encourages creepage of the electrolyte and actually may drive electrolyte from the cell, no matter how good the mechanical seal is.

Co-pending United States application, Serial No. 774,929, filed by J. L. S. Daley and E. E. Leger on November 19, 1958, is directed to a seal ring which minimizes electrocapillary action within the cell. The present application is particularly directed to means for minimizing electrocapillary action across the outside of a cell closure.

Accordingly, the principal object of the invention is to provide a cell closure which will prevent creepage of electrolyte from an alkaline galvanic cell.

A concurrent object of the invention is to provide a cell closure which substantially prohibits external electrocapillary action from taking place.

Another concurrent object of the invention is to provide a cell closure which also prevents normal mechanical leakage from an alkaline cell.

Broadly stated, the objects of the invention are accomplished by mechanically tight cell closure which eliminates all short, wettable paths between the polarized members of a cell and thus reduces any electrocapillary action to a minimum.

More specifically, the cell closure of the invention comprises a non-polarized cover, a polarized terminal centrally located in the cover, and a seal gasket of a hard di-electric plastic (preferably nylon) which is resistant to cold flow. The gasket is common to both the positive seal, i.e., between the container and cell cover, and to the negative seal, i.e., between the negative terminal and the cover.

The feature of utilizing a non-polarized cover eliminates any short paths between oppositely charged parts of the cell which could be easily wetted and thereby cause the establishment of electrocapillary action. In addition, both the positive and negative seals are rendered extremely tight mechanically by radial compression of the seal gasket between the cover and container and cover and terminal as taught in our co-pending United States patent application, Serial No. 774,931, filed November 19, 1958.

The invention will be more readily understood by reference to the accompanying drawing, wherein FIG. 1 is a front elevation, partially in section, showing an alkaline manganese dioxide-zinc cell, employing the preferred cell closure of the invention;

FIG. 2 is a sectional view of the cell closure members of FIG. 1 prior to assembly;

FIG. 3 shows the cell closure members of FIG. 2 after the assembling and radial sealing of the negative terminal seal; and FIG. 4 is a front elevation, partially in section, showing an alkaline manganese dioxide-zinc cell employing another embodiment of the cell closure of the invention.

Referring now to the drawings, and particularly FIG. 1, an alkaline manganese dioxide-zinc cell which comprises a cupped container 10, provided with an insulating jacket 11, and having an anode 12 and cathode 14, separated by a separator 16 and electrolyte 18, disposed therein, may be sealed with the cell closure of the invention as set forth below.

As shown more clearly in FIG. 2, the cell closure of the invention comprises a non-polarized metallic cover 20, a polarized metallic flanged terminal 22 provided initially with a tapered section 24, and an annular U shaped seal gasket 26, of hard plastic material, preferably nylon.

As shown in FIG. 3, the initial step in sealing a cell with the closure of the invention, comprises radially sealing the polarized terminal 22 in place. This may be accomplished by driving the tapered polarized terminal 22 through a central aperture 28 provided in the seal gasket 26 with the non-polarized cover already in place. The terminal 22 is deliberately of a slightly larger diameter than the aperture 28 in the seal gasket 26, so that when the tapered terminal 22 is driven through the aperture 28 in the seal gasket 26, the seal gasket 26 is radially compressed between the cover 20 and the terminal 22, thereby furnishing an extremely tight mechanical seal at this point. Subsequent to this sealing the tapered section 24 of the terminal post 22 may be flattened out to firmly secure it in place.

The thus sealed members of the cell closure are then positioned in the open-topped container 10 and an extremely tight mechanical seal between the polarized container 10 and the non-polarized cover 20 is accomplished by drawing the container 10 through a reducing die to radially compress the outer periphery 27 of the seal gasket 26 between the container 10 and the cover 20.

Another method of accomplishing the radial seal at the polarized terminal is illustrated in the cell shown in FIG. 4. In this embodiment an open-mouthed flanged rivet 30 which constitutes the polarized terminal is passed through the aperture 28 in the gasket 26 with the cover 20 in place, and subsequently expanded so that it radially compresses the seal gasket 26 between the rivet 30 and the cover 20. As explained before, the thus assembled cell closure members are then positioned in the cupped container 10 and the container 10 is drawn through a reducing die to radially compress the outer periphery 27 of the gasket 26 between the container 10 and the cover 20.

If desired, in either of the embodiments shown in

FIGS. 1 and 4 after the cell container 10 has been sealed with the cell closure of the invention, an insulating washer 32 may be positioned across the cell closure and an external metallic cover 34, which is in contact with the polarized terminal 22 or 30, is provided across the open end of the cell jacket 11. In any event, the polarized terminal 22 or 30 is in contact with the anode 12 by means of an anode collector 31.

Preferably, in the practice of the invention, as illustrated in FIGS. 1 and 4, the seal gasket 26 which is employed is provided with a depending flange 36 which minimizes any internal electrocapillary action as explained in the aforementioned United States patent application, Serial No. 774,929.

The combination of a depending flange with an unpolarized cover which eliminates all short paths between oppositely charged parts of the cell which could be either internally or externally wetted and with the extremely tight mechanical radial sealing of the seal gasket at both the positive and negative terminal of the cell, results in a truly leak resistant cell.

Illustrative of the success of the invention are the results of tests recorded in the table set forth below. In these tests, the quality of the cell closure of the invention was determined in a short period of time by storage under extreme conditions. The cells tested were stored for thirty days at 95° F. and 90 percent relative humidity. The control cells were cells which were sealed by radially compressing a plastic non-conductive gasket between a positively polarized container, and an unpolarized cover. The cover was polarized after the closure was made by attaching a connector from the negatively charged center terminal post to a fastener inserted in the metal cover.

After thirty days storage, under the indicated conditions, the cells were observed and classified into three categories based on the caustic crust formation around the seal portion of the cell. The three categories were identified as none, light, and heavy. Cells having a heavy crust formation are deemed unacceptable for use.

TABLE

*Percent of Cells Showing Caustic Creepage After 30 Days Storage at 95° F. and 90 Percent Relative Humidity*

| Type of seal | Caustic crust formation | | |
|---|---|---|---|
| | None | Light | Heavy |
| Control | 0 | 70 | 30 |
| Tapered terminal (Fig. 1) | 100 | 0 | 0 |
| Bulged rivet terminal (Fig. 4) | 27 | 66 | 7 |

A study of these results shows that when the preferred tapered terminal post of the invention is employed there is no creepage whatsoever of electrolyte to the outside of the cell container. When the bulged rivet terminal is employed 27 percent of the cells evidenced no creepage and only 7 percent were unacceptable. In contrast, the seal of the prior art permitted some leakage in all of the cells and in 30 percent of the cases this creepage was of such magnitude that the cells were unacceptable.

We claim:

1. A sealed galvanic cell comprising a cupped polarized metallic container having disposed therein an anode and a cathode with a separator therebetween and an alkaline electrolyte; said cell being sealed at the open end of said cupped container by a cell closure which comprises an annular U shaped gasket of a hard di-electric plastic which is resistant to cold flow, said gasket having a central aperture therein, an annular apertured unpolarized metallic cover recessed in said U shaped gasket and an oppositely polarized metallic terminal which passes through said apertures in said gasket and said cover; said gasket being under radial compression between said cover and said terminal and between said cover and said container.

2. The sealed galvanic cell of claim 1 wherein said annular U shaped gasket is of a hard nylon and is provided with an annular depending flange generally spaced from the inner walls of said container and from said terminal to eliminate all internal short paths between said oppositely polarized container and terminal.

3. In a galvanic cell, a cell closure for sealing said galvanic cell against electrolyte leakage; said galvanic cell comprising a cupped metallic polarized container having disposed therein an anode and a cathode with a separator therebetween and an alkaline electrolyte; said cell closure comprising an annular U shaped gasket of a hard di-electric plastic which is resistant to cold flow, said gasket having a central aperture therein, an annular apertured unpolarized metallic cover recessed in said U shaped gasket, and an oppositely polarized metallic terminal which passes through said apertures in said gasket and said cover; said gasket being under radial compression between said cover and said terminal and between said cover and said container.

4. The cell closure of claim 3 wherein said annular U shaped gasket is of hard nylon and is provided with an annular depending flange generally spaced from the inner walls of said container and from said terminal to eliminate all short paths between said oppositely polarized container and terminal.

5. A method of assembling a sealed galvanic cell characterized by resistance to electrolyte leakage, said cell comprising a cupped polarized metallic container having disposed therein an anode and a cathode with a separator therebetween, an alkaline electrolyte, an annular unpolarized apertured metallic cover, and an oppositely polarized terminal centrally located in said cover, said terminal being initially provided with a taper; said method comprising the steps of providing a central aperture for said terminal, of a slightly smaller diameter than the diameter of said terminal, in an annular U shaped gasket of a hard di-electric plastic which is resistant to cold flow, disposing said apertured cover in said U shaped gasket, sealing said terminal aperture by driving said terminal through said aperture in said gasket thereby radially compressing said gasket between said cover and said terminal, positioning said thus assembled gasket, cover, and terminal in the open end of said container, and finally radially reducing the diameter of the open end of said container, thereby radially compressing said gasket between said cover and said container.

6. The method of claim 5 wherein said central aperture is provided in an annular U-shaped gasket made of hard nylon and having an annular depending flange generally spaced from the inner walls of said container and from said terminal to eliminate all internal short paths between said oppositely polarized container and terminal.

7. A method of assembling a sealed galvanic cell characterized by resistance to electrolyte leakage, said cell comprising a cupped polarized metallic container having disposed therein an anode and a cathode with a separator therebetween, an alkaline electrolyte, an annular unpolarized apertured metallic cover and an oppositely polarized terminal centrally located in said cover, said terminal being an open-mouthed rivet; said method comprising the steps of providing a central aperture for said terminal in an annular U shaped gasket of a hard di-electric plastic which is resistant to cold flow, disposing said apertured cover in said U shaped gasket, sealing said terminal aperture by inserting said terminal rivet in said aperture, and expanding said open mouthed rivet to radially compress said gasket between said rivet and said cover, positioning said thus assembled gasket, cover, and terminal in the open end of said container, and finally radially reducing the diameter of the open end of said container, thereby radially compressing said gasket between said cover and said container.

8. The method of claim 7 wherein said central aperture is provided in an annular U shaped gasket made of hard nylon and having an annular depending flange generally spaced from the inner walls of said container and from said terminal to eliminate all short paths between said oppositely polarized container and terminal.

9. A sealed galvanic cell comprising a cupped polarized metallic container having disposed therein an anode and a cathode with a separator therebetween and an alkaline electrolyte; said cell being sealed at the open end of said cupped container by a cell closure which comprises an annular U shaped gasket of a hard di-electric plastic which is resistant to cold flow, said gasket having a central aperture therein, an annular apertured unpolarized metallic cover recessed in said U shaped gasket and an oppositely polarized metallic terminal which passes through said apertures in said gasket and said cover; said gasket being radially compressed between said cover and said terminal.

10. A method of assembling a sealed galvanic cell characterized by resistance to electrolyte leakage, said cell comprising a cupped polarized metallic container having disposed therein an anode and a cathode with a separator therebetween, an alkaline electrolyte, an annular unpolarized apertured metallic cover, and an oppositely polarized terminal centrally located in said cover, said terminal being initially provided with a taper; said method comprising the steps of providing a central aperture for said terminal, of a slightly smaller diameter than the diameter of said terminal, in an annular U shaped gasket of a hard di-electric plastic which is resistant to cold flow, disposing said apertured cover in said U shaped gasket, sealing said terminal aperture by driving said terminal through said aperture in said gasket and said cover thereby radially compressing said gasket between said cover and said terminal, positioning said thus assembled gasket, cover, and terminal in the open end of said container, and finally, sealing said container.

11. A method of assembling a sealed galvanic cell characterized by resistance to electrolyte leakage, said cell comprising a cupped polarized metallic container having disposed therein an anode and a cathode with a separator therebetween, an alkaline electrolyte, an annular unpolarized apertured metallic cover and an oppositely polarized terminal centrally located in said cover, said terminal being an open-mouthed rivet; said method comprising the steps of providing a central aperture for said terminal in an annular U shaped gasket of a hard di-electric plastic which is resistant to cold flow, disposing said apertured cover in said U shaped gasket, sealing said terminal aperture by inserting said terminal rivet in said aperture and expanding said open mouthed rivet to radially compress said gasket between said rivet and said cover, positioning said thus assembled gasket, cover, and terminal in the open end of said container, and finally, sealing said container.

References Cited in the file of this patent

UNITED STATES PATENTS

| | | |
|---|---|---|
| 2,636,062 | Colton | Apr. 21, 1953 |
| 2,697,736 | Goldberg | Dec. 21, 1954 |
| 2,829,186 | Kort | Apr. 1, 1958 |
| 2,934,584 | Warren et al. | Apr. 26, 1960 |

FOREIGN PATENTS

| | | |
|---|---|---|
| 1,221,765 | France | Jan. 18, 1960 |